United States Patent

[11] 3,593,325

[72] Inventor Gunter Salzmann Dresden, Germany
[21] Appl. No. 791,466
[22] Filed Jan. 15, 1969
[45] Patented July 13, 1971
[73] Assignee Institut Fur Elektronik Dresden Dresden, Germany

[54] MAGNETIC THIN FILM STORAGE DEVICE FOR NONDESTRUCTIVE READOUT THEREOF
10 Claims, 4 Drawing Figs.

[52] U.S. Cl. .......... 340/174 TF, 340/HP, 340/QA, 340/PW, 340/VA, 340/ZB
[51] Int. Cl. .......... G11c 11/14
[50] Field of Search .......... 340/174 TF

[56] References Cited
OTHER REFERENCES

Publication I - IBM TECH. DISCL. BULLETIN, Vol. 7, No. 9, Feb. 1965, pgs. 813— 814

Publication II - IBM TECH. DISCL. BULLETIN, Vol. 8, No. 12, May 1966, pg. 1829

Publication III - IBM TECH. DISCL. BULLETIN, Vol. 8, No. 11, Apr. 1966, pgs. 1618— 1619

Publication IV - IBM TECH. DISCL. BULLETIN, Vol. 6, No. 6, Nov. 1963, pgs. 55— 56

*Primary Examiner*—James W. Moffitt
*Attorney*—Nolte and Nolte

ABSTRACT: A magnetic thin film device susceptible to the influence of an external magnetic pulse field comprises an anisotropic magnetic storage film having a pair of spaced surfaces and a pair of electrical conductors each in electrical contact with and next adjacent a corresponding one of the surfaces of the film.

INVENTOR
GÜNTER SALZMANN

BY Nolte & Nolte
ATTORNEYS

INVENTOR
GÜNTER SALZMANN

BY Nolte & Nolte
ATTORNEYS

MAGNETIC THIN FILM STORAGE DEVICE FOR NONDESTRUCTIVE READOUT THEREOF

Description of the Invention

THe present invention relates to a magnetic thin film storage device. More particularly, the invention relates to a magnetic thin film storage device and a method for nondestructive readout thereof. The magnetic thin film storage device of the present invention, which may be read out nondestructively and which is susceptible to the influence of an external magnetic pulse field, comprises a storage unit having at least one magnetic thin film device.

There are various known magnetic thin film storage devices and known methods for nondestructive readout thereof. One known device utilizes a pair of superposed magnetostatically coupled film elements with different magnetic properties, particularly with different anisotropic field strengths. The film element with the greater anisotropy functions as the storage film and the film element with the lesser anisotropy functions as the readout film. Information is read out from the storage film by the application of a field pulse of sufficient magnitude that the magnetization vector of the readout film turns through a wide angular range, thereby providing a sufficiently strong readout signal. The field applied to the storage film, however, is not strong enough to alter the storage state. When the magnetic switching field pulse is switched off, the magnetization vector returns to its initial position. The magnetostatic coupling of the film elements also returns the magnetization vector of the readout film to its initial position.

Other known devices utilize so-called "trapped flux". A film element has an open flux structure which produces a stray magnetic flux. The stray flux permeates the metallic conductors, which functions to produce the control fields, in the vicinity of the film element. Information is read out by a magnetic switching field pulse which is generally of very short duration and is effective in the hard magnetization direction of the hard axis. This causes the magnetization to rotate from the easy magnetization direction. The varying stray magnetic flux in the adjacent electrical conductors produced eddy currents, which in turn produce magnetic fields which counteract the variation in magnetization. When the magnetic switching field pulse is switched off, the magnetic fields function as a magnetic control field in the easy magnetization direction of the film element, so that the initial storage state is restored.

Other known devices utilize a metal, nonmagnetic electrical conductor between a pair of superposed film elements. The interposed nonmagnetic conductor functions as a magnetic shield and delays the penetration of a magnetic switching field pulse applied to the readout film therethrough in time. The magnetic field pulse is terminated before the magnetic field strength on the storage film side of the magnetic shield becomes so strong that irreversible changes in magnetization occur in the storage film. After the termination of the magnetic switching field pulse, the magnetostatic coupling of the readout film element and storage film element restores said film elements to their initial condition. The readout of information is thus nondestructive.

Still other known devices combine the aforedescribed principles of magnetostatic coupling between film elements of different magnetic properties, eddy current retardation by "-trapped flux", and a magnetic shield for nondestructive readout.

In all of the known devices and methods, the restoration of the initial magnetic condition of information stored in a film element and readout by a magnetic switching field pulse, is due to a stray magnetic field applied to the film element and produced by the other film element or by eddy currents produced by stray magnetic fluxes.

Attempts have been made to provide nondestructive readout of information by applying the storage film element to a conducting substrate and disposing a strip conductor loop on the film in electrical connection with said substrate lateral beside said film element to form a short circuit. A current is produced in the strip conductor and produces a restoring control field in the easy magnetization direction during readout, so that readout is nondestructive.

The known magnetic thin film devices and methods for nondestructive readout of information have several disadvantages when they are utilized in various technical applications. These disadvantages include the requirement that the thin film elements of a thin film storage device have different magnetic properties, that the magnetic switching field pulses for read-in and readout of information differ in amplitude or duration, and that the magnetic switching field pulses be of very short duration and have very fast rise times. Furthermore, methods based on magnetostatic coupling of the thin film elements by stray magnetic fields in the easy magnetization direction are not applicable with thin film elements having a closed flux structure in the easy magnetization direction. The short circuit strip device requires considerable space and cannot be used for continuous or strip-shaped films. The shielding effect of the strip conductor loop has an adverse effect on the speed of operation of the device, especially during read-in.

THe disadvantages of the known devices and methods result in complex and costly manufacturing techniques, additional expenditure for the production of switching field pulses, and the prevention of the use of economical forms of memory organization.

The principal object of the present invention is to provide a new and improved magnetic thin film storage device and a new and improved method for nondestructive readout thereof.

An object of the present invention is to provide a magnetic thin film storage device which may be read out nondestructively.

An object of the present invention is to provide a magnetic thin film storage device which avoids the disadvantages of known magnetic thin film storage devices.

An object of the present invention is to provide a magnetic thin film storage device which requires less expenditure for preparing the switching field pulses.

An object of the present invention is to provide a magnetic thin film storage device which requires little space.

An object of the present invention is to provide a magnetic thin film storage device which may be manufactured by a simple technique, which may be read out nondestructively and in which read-in and readout information is possible by identical switching field pulses.

In accordance with the present invention, a magnetic thin film storage device which may be readout nondestructively comprises a storage unit having at least one magnetic thin film device comprising an anisotropic magnetic storage film having a pair of spaced surfaces. A pair of electrical conductors are provided, each in electrical contact with and next adjacent a corresponding one of the surfaces of the magnetic storage film. Each of the magnetic thin film devices is susceptible to the influence of an external magnetic pulse field. The magnetic storage film has an easy magnetization direction and a hard magnetization direction perpendicular to the easy magnetization direction. One of the electrical conductors may have slots formed therein extending in the hard magnetization direction, or alternately in both the easy and hard magnetization directions, of the magnetic storage film thereby dividing this electrical conductor into a plurality of substantially isolated segments.

The electrical conductors may have different electrical conductivities from each other. Each of the storage units may further comprise an anisotropic magnetic readout film having a pair of spaced surfaces one of which is next adjacent a corresponding surface of one of the electrical conductors with or without an intermediate layer. The magnetic storage film and the magnetic readout film are coupled magnetostatically and may have the same material composition and the same magnetic properties. Each of the magnetic storage film and the magnetic readout film has a thickness dimension which is mutually perpendicular to the easy magnetization direction and the hard magnetization direction of the magnetic storage film, the thickness of the readout film being greater than that of the storage film.

In accordance with the present invention, a method for nondestructive readout of a magnetic thin film storage device comprising a plurality of storage units each having at least one magnetic thin film device comprising an anisotropic magnetic storage film having a pair of spaced surfaces and a pair of electrical conductors each in electrical contact with and next adjacent a corresponding one of the surfaces of the magnetic storage film, each of the magnetic thin film devices being susceptible to the influence of an external magnetic pulse field, comprises applying to a storage unit to be read out by a magnetic switching field pulse having a duration, amplitude and rise time in the hard magnetization direction of the magnetic storage film of the magnetic thin film device to produce in a loop formed by the electrical conductors and the magnetic thin film by induced current a magnetic control field having a magnitude in the easy magnetization direction of the magnetic storage film sufficient to restore the initial state of magnetization in the magnetic storage film when the magnetic switching field pulse is switched off. In accordance with the present invention, a method for the nondestructive readout of a magnetic thin film storage device comprises applying to a storage unit comprising a magnetic readout film which induces a voltage pulse at the trailing edge of the magnetic switching field pulse for readout of information from the magnetic storage film.

In order that the present invention may be readily carried into effect, it will now be described with reference to the accompanying drawings, wherein.

The same components are identified by the same reference numerals in each of the figures.

Figure 1:
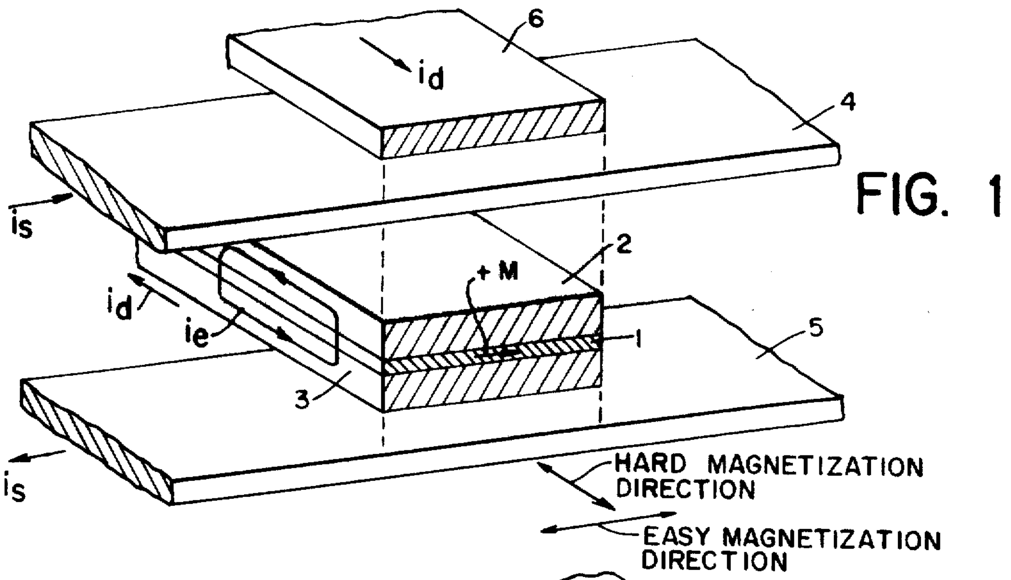
FIG. 1 is a perspective view of part of an embodiment of a magnetic thin film device of the present invention.

In FIG. 1, an anisotropic magnetic thin storage film 1 has a pair of spaced planar surfaces. The storage film 1 is positioned between a pair of electrical conductors 2 and 3 so that the conductors 2 and 3 are each in electrical contact with and next adjacent a corresponding one of the planar surfaces of the magnetic storage film 1. THe thin film device of FIG. 1 is susceptible to the influence of an external magnetic pulse field.

A pair of electrical conductors 4 and 5 is provided for producing a magnetic switching field pulse $H_s$ in the hard magnetization direction of the magnetic storage film 1 in response to a current pulse $i_s$ in these conductors. The conductors 4 and 5 are parallel to each other and on opposite sides of the storage film 1, with the conductor 4 adjacent the conductor 2 and the conductor 5 adjacent the conductor 3. An additional electrical conductor 6 is provided at right angles to the conductors 4 and 5 and adjacent the conductor 4. The conductor 6 is parallel to the conductors 2 and 3. The circuit comprising the conductors 2, 3 and 6 produces a magnetic control field $H_d$ in the easy magnetization direction of the magnetic storage film 1.

In order to explain the operation of the device of FIG. 1, assume that the magnetization position of information stored in the magnetic storage film 1 is +M. The magnetization vector of the magnetic storage film 1 is indicated by an arrow +M in FIG. 1. A current pulse $i_s$ flowing through the conductors 4 and 5 produces a magnetic switching field pulse $H_s$ for the readout of information from the magnetic storage film 1. THe magnetic switching field pulse $H_s$ produces, in the hard magnetization direction in the plane of the magnetic storage film 1, a magnetic field having a strength which may exceed the anisotropic field strength $H_k$ of said magnetic storage film and which alters the magnetization vector from the direction of easy magnetization to the direction of hard magnetization. This causes a change of the magnetic flux component in the easy magnetization direction and results in the induction of a voltage pulse between the conductors 2 and 3.

Due to the electrically conductive connection of the conductors 2 and 3 to each other via the magnetic storage film 1, the induced voltage pulse produces a current $i_e$ in said conductors. The current $i_e$ in the conductors 2 and 3 produces a magnetic field strength component in the direction of the stored magnetization condition +M of the magnetic storage film 1. The magnetic field strength component functions as a magnetic control field $H_d$ when the magnetic switching field pulse $H_s$, is switched off thereby insuring the restoration of the initial magnetization condition of the magnetic storage film 1, so that the read out information is rewritten.

The change of the magnetic flux component in the direction of easy magnetization upon the application of the switching field pulse $H_s$, and the voltage drop in the conductors 2 and 3 resulting in the current $i_e$, produce in the conductors 2, 3 and 6 a voltage pulse which may be utilized to read out stored information from the magnetic storage film 1. In order to prevent the readout of information, even after considerable repetition, from producing irreversible variation of the magnetization condition of the magnetic storage film 1, the magnetic field strength component H in the easy magnetization direction of said storage film for rewriting of information must not decrease below a predetermined value $H_1$ upon the termination or cessation of the switching field pulse $H_s$. The termination or cessation of the switching field pulse $H_s$ is the application of its trailing edge.

The magnetic field strength component H in the direction of easy magnetization of the storage film 1, for the rewriting of information, is time-dependent, because the current $i_e$ which produces said component decreases in an approximately exponential function. The required minimum value $H_1$ of the field strength component may be exceeded by a suitable determination of the duration of the magnetic switching field pulse $H_s$, the thickness of the conductors 2 and 3 and the electrical conductivity of said conductors. The conductors 2 and 3 determine the decay time constant for the current $i_e$. The information is nondestructively read out in a corresponding manner, when the magnetic storage film 1 initially has an antiparallel magnetization condition −M instead of the magnetization condition +M.

Read-in or writing of information may be achieved in a known manner by the coincidence of two orthogonal magnetic pulse fields. The switching field pulse $H_s$ applied in the hard magnetization direction turns the magnetization vector out of the rest position into the hard magnetization direction. A magnetic control field $+H_d$ is simultaneously applied in the easy magnetization direction. When the switching field pulse $H_s$ is switched off, the magnetization vector of the storage film 1 is rotated to the easy magnetization direction, as determined by the magnetic control field $H_d$, and information is written or read in in such manner.

In the embodiment of FIG. 1, the magnetic switching field pulse $H_s$ is produced by a current pulse $i_s$ in the circuit of the electrical conductors 4 and 5. A current pulse $\pm i_d$ in the circuit of the electrical conductors 2, 3 and 6 produces the magnetic control field $+H_d$.

Figure 2:
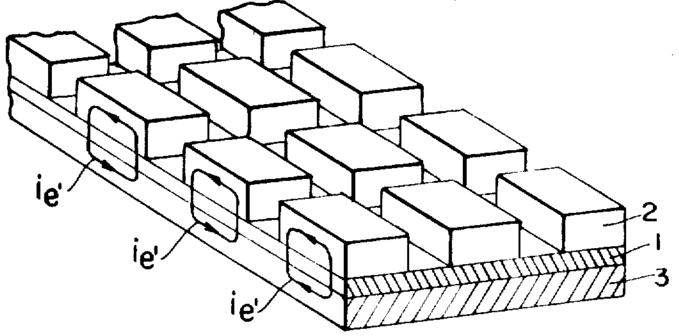
FIG. 2 is a perspective view of part of a modification of the magnetic thin film device of FIG. 1.

A generally encountered difficulty is that the shielding effect of the conductors 2 and 3 caused by eddy currents which develop when the magnetic field pulse is switched on, the switching field pulse $H_s$ and the control field $+H_d$ do not reach the magnetic storage film 1 rapidly enough and in adequate strength. This difficulty may be overcome with regard to the switching field pulse $H_s$ by forming channels, grooves, slots or the like in one or both electrical conductors 2 and 3 in the hard magnetization direction. The slots formed therein divide the electrical conductor 2 or 3 or both into segments extending in the direction of hard magnetization of the magnetic storage film 1, as shown in FIG. 2. The restoration currents $i_e$ are not adversely affected by the division.

The magnetic control field $+H_d$ will penetrate the conductor 2 if said conductor has a small thickness and if the pulses of said control field have a sufficient duration. As shown in FIG. 2, the channels, grooves, slots or the like formed in the electrical conductor 2 prevent the formation of eddy currents and assure the penetration of the control field $+H_d$ to the magnetic storage film 1. At the same time, the slots in the conductor 2 divide the restoration, re-read-in or rewrite current $i_e$ into a plurality of partial currents $i_e$.

THe restoration magnetic field produced by the restoration currents $i_e$ varies in strength in the different areas of the magnetic storage film. During the nondestructive readout of information, however, the magnetostatic coupling between the areas of the magnetic storage film 1 causes the restoration or rewriting of the information into the entire said magnetic storage film. The slots formed in one or both electrical conductors 2 and 3 may also be in the hard magnetization direction as well as in the easy magnetization direction of the magnetic storage film 1 to divide such conductor or conductors into a plurality of substantially isolated segments, as shown in FIG. 2.

The electrical conductors 2 and 3 may have different electrical conductivities from each other. The electrical conductor 3 may be an expanded metal plate and may be utilized as the carrier for the magnetic storage film 1, which may be precipitated thereon in a known manner. The conductor 3 may also function as the carrier for the conductor 2 and as a return path for the current pulses is and $\pm i_d$. A magnetic flux closure of a material which is a good magnetic conductor, may be provided under the electrical conductor 3 constructed in the form of a thin foil or above the electrical conductor 6 in order to diminish stray magnetic fields.

Figure 3:
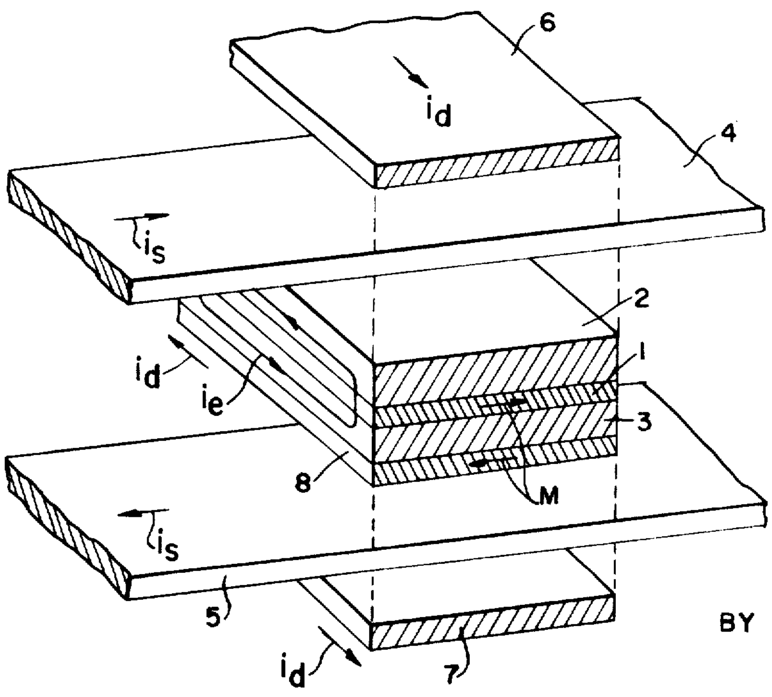
FIG. 3 is a perspective view of part of another embodiment of the magnetic thin film device of the present invention.

FIG. 3 illustrates another embodiment of the magnetic thin film storage device of the present invention. The embodiment of FIG. 3 is the same as that of FIG. 1, except that FIG. 3 includes another anisotropic magnetic thin film element 8, which functions as a readout film. The magnetic readout film 8 has a pair of spaced planar surfaces, one of which is next adjacent the surface of the conductor 3 farthest from the magnetic storage film 1. It is profitable that the magnetic storage film 1 and the magnetic readout film 8 have the same material composition and the same magnetic properties.

The addition of the readout film 8 permits the read-in and readout functions to be provided by separate magnetic thin film elements. The easy magnetization directions of the storage film 1 and the readout film 8 are parallel. The magnetic storage film 1 functions, in accordance with the present invention, to store binary information. The storage film 1 produces the restoring or rewriting current $i_e$ during readout of information. The readout signal is provided primarily by the rotation of the magnetization vector of the magnetic readout film 8.

The magnetic readout film 8 permits the production of a stronger readout signal, since, in contrast to the magnetic storage film 1, the rotation of the magnetization vector of said readout film is not hindered by the restoring or rewriting current $i_e$ upon the application of the switching field pulse $H_s$. Furthermore, the magnetic thin film elements 1 and 8 form an almost closed magnetic flux path, so that stray magnetic field are diminished, as desired.

Writing or read-in of information in the embodiment of FIG. 3 is in the same manner as in the embodiment of FIG. 1. However, the vector of the magnetization state M of the magnetic readout film 8 must be brought into antiparallel position with respect to the magnetization vector of the magnetic storage film 1.

The control field $H_d$ in the easy magnetization direction, produced by the current pulse $i_d$, is different in strength in the storage and readout films 1 and 8. The sum of the field strength components produced by the currents in the conductors 3 and 6 is provided in the storage film 1 whereas their differences is provided in the readout film 8. Nevertheless, magnetostatic coupling between the storage film 1 and the readout film 8 results in the magnetization vectors being brought into antiparallel position after read-in, restoration or writing of information.

Furthermore, there is the known possibility of producing a sufficiently powerful control field $H_d$ by providing an additional electrical conductor 7 in parallel spaced relation with the conductor 6. The conductors 6 and 7 are similar in dimensions and characteristics and sandwich the conductors 4, 5, 2 and 3 and the magnetic thin films 1 and 8 between them. The conductors 6 and 7 are at the same potential, and when the current pulse $i_d$ is provided in said conductor 7 it produces a sufficiently strong control field $H_d$ for the readout film 8.

The embodiment of FIG. 3 also permits a modified method of readout of information stored in the magnetic storage film 1. In known methods for the nondestructive readout of magnetic thin films, the voltage pulse, induced in the thin film element by the rotation of the magnetization due to the application of the switching field pulse $H_s$, is utilized for the readout of information. Upon the termination of the switching field pulse $H_s$, the magnetization which has been turned into the hard magnetization direction returns into a position parallel to the easy magnetization direction. A voltage pulse induced thereby functions to read out the information when the magnetization returns to its position determined by the magnetic storage film 1. This is the case in the nondestructive readout method of the present invention.

This mode of readout has the advantage that the magnetization state at the beginning of the switching field pulse $H_s$ is immaterial. Reversal of magnetization of the readout film 8 due to the known creep effect or demagnetization is thus of no consequence. This permits the production of a stronger voltage pulse by providing readout film 8 with a greater thickness than that of the storage film 1. The thickness dimension is that which is mutually perpendicular to the easy magnetization direction and the hard magnetization of the magnetic storage film 1.

The embodiment of FIG. 3 also functions as desired when information stored for the first time is read in or written into only the storage film 1, and not into the readout film 8 at the same time.

Figure 4:
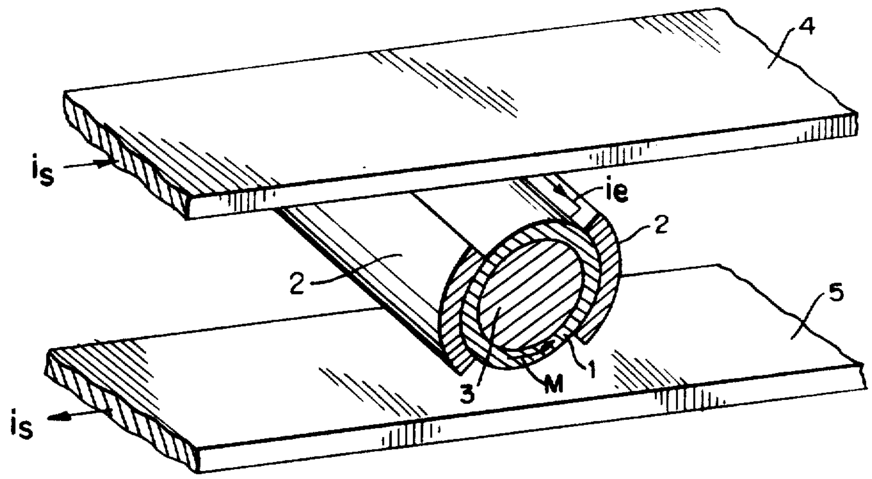
FIG. 4 is a perspective view of part of another embodiment of the magnetic thin film device of the invention.

Another possibility of realizing the storage arrangement according to the invention is shown in FIG. 4. Here the storage film 1 and the conductor 2 are applied on a wire-shaped carrier 3. The conductor 2 is provided in the represented embodiment with two slots in the hard direction which serve to eliminate eddy currents as described above. In accordance with the foregoing considerations, a greater number of slots can be provided in the hard direction. The nondestructive readout according to the invention, as well as the writing of information are effected in the same manner as has been described with reference to FIGS. 1—3 such that further explanation is considered unnecessary.

The magnetic thin film storage device of the present invention may be operated to read in or read out information by short duration switching field pulses having similar amplitude, duration and shape.

The magnetic thin film elements of the present invention may be provided on the carrier conductor 3 by any suitable process and any suitable material and shape may be utilized for such conductor without affecting the desired operation of the magnetic thin film device of the present invention. Furthermore, the magnetic storage film 1, the readout film 8 and the electrical conductors 2 and 3 may comprise any suitable configuration such as, for example, tapes, strips, continuous films, discrete elements or the like.

While the invention has been described by means of specific examples and in specific embodiments, I do not wish to be limited thereto, for obvious modification will occur to those skilled in the art without departing from the spirit and scope of the invention.

What I claim is:

1. A magnetic thin film storage device for nondestructive readout, comprising an anisotropic, magnetic, electrically conducting storage film including a pair of opposite surfaces, an easy magnetization direction, as well as a hard magnetization direction, said device further comprising two electrical conductors, one of said conductors being in direct electrical contact with one of said film surfaces, whereas the other of said conductors is in direct electrical contact with the other of said surfaces whereby a closed current loop is formed by said conductors through said storage film, and means operatively positioned for subjecting the storage device to a magnetic switching field impulse of such duration, amplitude and rise time in said hard magnetization direction for the readout of information from said storage film that a magnetic current is induced in said current loop to produce a magnetic control field having a magnitude in said easy magnetization direction of said magnetic storage film sufficient to reproduce the initial state of magnetization in said magnetic storage film when the switching field disappears so that the readout information is restored.

2. The apparatus according to claim 1, wherein said switching field impulse has a trailing edge, said apparatus further comprising readout means for ascertaining a voltage impulse induced at said trailing edge of the switching field impulse.

3. The magnetic thin film storage device as claimed in claim 1, wherein one of said electrical conductors has slots formed therein which divide said one electrical conductor into segments extending in the direction of said hard magnetization of said magnetic storage film.

4. The magnetic thin film storage device as claimed in claim 1, wherein said easy magnetization direction extends perpendicularly to said hard magnetization direction and one of said electrical conductors having first slots formed therein extending in the hard magnetization direction of said magnetic storage film and second slots formed therein extending in the easy magnetization direction of said magnetic storage film, thereby dividing said one electrical conductor into a plurality of substantially isolated segments.

5. The magnetic thin film storage device as claimed in claim 1, wherein said electrical conductors have different electrical conductivities from each other.

6. The magnetic thin film storage device as claimed in claim 1, wherein one of said conductors is in the form of a wire and said storage film and said other conductor are arranged in ring form around said wire.

7. The magnetic thin film storage device as claimed in claim 1, further comprising an anisotropic, magnetic readout film having a pair of spaced surfaces one of which is located adjacent to a corresponding surface of one of said electrical conductors.

8. The magnetic thin film storage device as claimed in claim 7, wherein said magnetic storage film and said magnetic readout film are made of the same material composition and have the same magnetic properties.

9. The magnetic thin film storage device as claimed in claim 7, wherein said magnetic storage film and said magnetic readout film both have a thickness dimension which is mutually perpendicular to the easy magnetization direction and the hard magnetization direction of said magnetic storage film, the thickness of said readout film being greater than that of said storage film.

10. The magnetic thin film storage device as claimed in claim 7, wherein the storage film, the conductors and the readout film are arranged in a planar plane-parallel configuration.